(12) United States Patent
Wang et al.

(10) Patent No.: US 11,829,116 B2
(45) Date of Patent: Nov. 28, 2023

(54) INTELLIGENT IDENTIFICATION AND WARNING METHOD FOR UNCERTAIN OBJECT OF PRODUCTION LINE IN DIGITAL TWIN ENVIRONMENT (DTE)

(71) Applicant: ZHENGZHOU UNIVERSITY OF LIGHT INDUSTRY, Zhengzhou (CN)

(72) Inventors: Haoqi Wang, Zhengzhou (CN); Hao Li, Zhengzhou (CN); Rongjie Huang, Zhengzhou (CN); Gen Liu, Zhengzhou (CN); Hongyu Du, Zhengzhou (CN); Bing Li, Zhengzhou (CN); Xiaoyu Wen, Zhengzhou (CN); Yuyan Zhang, Zhengzhou (CN); Chunya Sun, Zhengzhou (CN)

(73) Assignee: ZHENGZHOU UNIVERSITY OF LIGHT INDUSTRY, Zhengzhou (CN)

( * ) Notice: Subject to any disclaimer, the term of this patent is extended or adjusted under 35 U.S.C. 154(b) by 100 days.

(21) Appl. No.: 17/734,113

(22) Filed: May 2, 2022

(65) Prior Publication Data
US 2023/0039454 A1 Feb. 9, 2023

(30) Foreign Application Priority Data
Aug. 5, 2021 (CN) .......................... 202110896179.3

(51) Int. Cl.
G05B 19/406 (2006.01)
G05B 19/4063 (2006.01)
G05B 19/4069 (2006.01)

(52) U.S. Cl.
CPC ..... *G05B 19/4063* (2013.01); *G05B 19/4069* (2013.01); *G05B 2219/31025* (2013.01); *G05B 2219/31439* (2013.01)

(58) Field of Classification Search
USPC ....................................................... 700/108
See application file for complete search history.

(56) References Cited

U.S. PATENT DOCUMENTS

| 9,977,425 B1 * | 5/2018 | McCann ................. G06Q 10/20 |
| 2019/0064769 A1 * | 2/2019 | Ren ...................... G05B 19/4069 |

(Continued)

FOREIGN PATENT DOCUMENTS

CN 111161410 A * 5/2020

*Primary Examiner* — Hien D Khuu
(74) *Attorney, Agent, or Firm* — True Shepherd LLC; Andrew C. Cheng

(57) ABSTRACT

An intelligent identification and warning method for an uncertain object of a production line in a digital twin environment, includes: establishing a model library for uncertain physical objects from a non-production line system; adding attribute data to the uncertain physical objects from the non-production line system; importing an established model library and added attribute data for the uncertain physical objects from the non-production line system into a model library of an existing DT production line system; performing auto-detection on an uncertain physical object entering a production line system; performing auto-detection on an actual size of the uncertain physical object entering the production line system; warning a danger for an unsafe object by means of voice prompting, system alarming and information pushing; matching a corresponding three-dimensional (3D) model in the established model library for a safe object; and loading a matched 3D model to the DT production line system.

5 Claims, 4 Drawing Sheets

(56) References Cited

U.S. PATENT DOCUMENTS

| | | | |
|---|---|---|---|
| 2020/0150637 A1* | 5/2020 | Yates | G05B 19/41885 |
| 2021/0357827 A1 | 11/2021 | Cella et al. | |
| 2022/0051184 A1 | 2/2022 | Cella et al. | |
| 2022/0058569 A1 | 2/2022 | Cella et al. | |

* cited by examiner

INTELLIGENT IDENTIFICATION AND WARNING METHOD FOR UNCERTAIN OBJECT OF PRODUCTION LINE IN DIGITAL TWIN ENVIRONMENT (DTE)

CROSS-REFERENCE TO RELATED APPLICATIONS

This application claims priority to Chinese Patent Application No. 202110896179.3 with a filing date of Aug. 5, 2021. The content of the aforementioned application, including any intervening amendments thereto, is incorporated herein by reference.

TECHNICAL FIELD

The present disclosure relates to the technical field of digital and intelligent production line control, and in particular to an intelligent identification and warning method for an uncertain object of a production line in a digital twin environment (DTE).

BACKGROUND ART

Digital twin (DT) is an effective way to realize deep fusion for a physical space and a virtual space. It is originally defined as a simulation model integrated with multiple physical properties, scales and probabilities, and can reflect states of real products or systems in real time. With continuous improvements, the DT has been applied to dozens of sectors such as manufacture, architecture, medical care, urbanization, and power grids. According to service scenarios of different sectors, different DT systems are defined. These DT systems feature precise mapping, virtual-real synchronization, intelligent feedback and optimal iteration, provided that physical entities in the virtual space and corresponding physical space are consistent in geometry, function and performance, namely the virtual space is a digital "mirror" of the physical space.

The workshop production line at which the present disclosure aims is a dynamic manufacturing system composed of workers, devices, networks, environments and the like. It is not only the production carrier and main managed object in manufacturing, but also the important system for which manufacturing enterprises compete against time. Whether the production line runs normally is directly associated with profits of the enterprises, and any stoppage of the production line arising from various factors will cause enormous economic losses to the enterprises. DT is envisioned as an effective way to realize digital transformation and intelligent upgrade of the conventional workshop production line. For the manufacturing process of industrial products, a DT production line system is intended to digitally establish a virtual model including all elements, procedures and services, and implement functions such as design of the industrial products on the production line, planning simulation of the production line, optimization of the manufacturing process, and management and control of production safety by means of bidirectional mapping and real-time interaction between the physical object and the virtual model.

In the DT production line system, accurate identification and fast modeling for an uncertain object from a non-production line system are crucial to realize the virtual-real synchronization and ensure the normal operation of the production line. Most virtual models in the DT production line system are established and determined in design phases. During operation of the production line, they can make changes synchronously and dynamically with physical objects through real-time data perception and feedback. However, when uncertain physical objects (such as operators from other stations, external materials, external transportation devices, fires, oil leakage and gas leakage) from the non-production line system suddenly enter the normal production line system, not only can the stable operation of the production line be affected, but the potential safety hazards are also caused. For example, when the automatic white body welding production line is running, a forklift for conveying sheet metal parts to other workshops comes into the production site suddenly by a mistake, and the on-site workers without receiving notifications may collide with the forklift. On the other hand, during driving, the forklift worker unfamiliar with the road in the production site may damage other operating devices to cause the production stoppage. For another example, when an open flame suddenly occurs in the production line system, the supervisor or on-site worker should give a warning as appropriate. In case of a small fire, the supervisor can quickly put it out. However, in case of an uncontrollable large fire, the supervisor should quickly notify the on-site workers for the evacuation and production stoppage.

Hence, in order to ensure the virtual-real synchronization and the safe production, the DT production line system is required to accurately identify the type of the uncertain physical object entering the production line system and quickly establish the corresponding virtual model. The conventional DT production line system has the defects of omissions and misjudgments, because it is monitored manually through videos, and depends on subjective judgments of the supervisor. In addition, even though the supervisor identifies the uncertain object timely, the virtual-real synchronization is hardly implemented in the DTE for the time-consuming process. In that process, the supervisor first notifies the technicians and provides the technicians with a geometry, a pose and other data of the physical object, and then the technicians establish the corresponding virtual model and load the newly established model to the virtual production line. In view of this, the present disclosure provides an intelligent identification and warning method for an uncertain object of a production line in a DTE. When an uncertain physical object from the non-production line system enters the normal production line, the present disclosure can employ a deep learning algorithm to determine the type of the uncertain physical object and detect the position and size of the uncertain physical object. When determining that the object is an unsafe object, it can give a warning timely to ensure the safe production. When determining that the object is the safe object, it can match a corresponding model in a model library with a model matching method, quickly establish a corresponding virtual model in the virtual production line according to detected actual position and size data, and load the virtual model to the virtual production line, to ensure that the virtual production line is the digital "mirror" of the physical production line.

SUMMARY

For the shortages in the background art, the present disclosure provides an intelligent identification and warning method for an uncertain object of a production line in a DTE, to solve the problem that the existing DT production line system hardly identifies the uncertain physical object from the non-production line and warns the unsafe object.

The present disclosure uses the following technical solutions:

An intelligent identification and warning method for an uncertain object of a production line in a DTE includes the following steps:

S1: establishing a model library for uncertain physical objects from a non-production line system: establishing, for a specific workshop production line system with computer aided design (CAD) software, three-dimensional (3D) solid models of all uncertain physical objects (a safe object such as a worker, a device and a material as well as an unsafe object such as an open flame, oil leakage and gas leakage not included in the production line) possibly entering the production line from the non-production line system, and classifying the models to obtain model families;

S2: adding attribute data to the uncertain physical objects from the non-production line system: determining, according to knowledge of a design engineer and a manufacturing engineer, the attribute data for the uncertain physical objects from the non-production line system, including a name, a serial number (unique identifier), a type, dimensions, a safety (including the safe object and the unsafe object) and a danger level, and directly adding the data to established 3D solid models of the uncertain objects through a secondary development interface of the CAD software;

S3: importing an established model library and added attribute data for the uncertain physical objects from the non-production line system in steps S1 and S2 into a model library of an existing DT production line system;

S4: performing, based on you only look once (YOLO), auto-detection on an uncertain physical object entering the production line system;

S5: detecting, based on binocular vision, an actual size of the uncertain physical object entering the production line system;

S6: determining, in real time according to a result of object detection in each of steps S4 and S5, a safety of the physical object entering the production line system, warning a danger in step S7 if the physical object is an unsafe object, and performing model matching in step S8 if the physical object is a safe object;

S7: warning the danger: warning the danger for the unsafe object by means of voice prompting, system alarming and information pushing, and selecting a different warning content according to a danger level of the unsafe object, for example, if a transport vehicle not in the production line enters the production line system, prompting an on-site worker with a voice for a caution, and notifying a workshop manager by pushing information to check an identity of the transport vehicle; and if a large fire occurs, alarming a danger by the system and prompting all workers with a voice for an orderly evacuation;

S8: matching, for the safe object, a corresponding virtual model in the established model library according to detected type and size of the uncertain physical object entering the production line: matching, according to type information in step S4, a model family of a same type in the established model library for the uncertain physical objects from the non-production line system in step S1, and finding a specific 3D model from the model family according to the actual size in step S5; and S9: performing, by the DT production line system, synchronous modeling on the uncertain object.

Further, the model library for the uncertain physical objects from the non-production line system may aim at the objects with which models are automatically matched, and may include not only the 3D solid models of the uncertain physical objects, but also the correspondingly added attribute information including the name, the serial number, the type, the dimensions, the safety and the danger level, where a model family to which each of the uncertain physical objects belongs may be identified through the type, a specific matched 3D solid model may be determined through the dimensions, whether to warn the danger is performed may be determined through the safety, and a danger warning content may be determined through the danger level.

Further, the performing, based on YOLO, auto-detection on an uncertain physical object entering the production line system in step S4 may include: performing, with a deep learning-based object detection method YOLO V3, object identification on the uncertain physical object entering the production line system to determine the type, the safety and the danger level of the uncertain physical object; adjusting, when training a deep learning model, parameters of the YOLO V3 in combination with a resolution, an illumination, a proportion of a detected object to a background, and the like in a video photographed by an on-site monitoring system of the production line, so as to improve an accuracy of the object detection; and warning, for the unsafe object upon completion of the object detection, the danger according to the danger level in combination with the methods such as the voice prompting method, the system alarming method and the information pushing method, the warning content being determined according to the danger level and the unsafe object; and specifically: segmenting, with an image for the uncertain physical objects from the non-production line system as a training image, the training image into C rows*C columns of grid cells, tagging segmented images, determining a bounding box, a type, a safety and a danger level of each of the segmented images, and performing a calculation on the C*C grid cells with a fully convolutional network (FCN) to obtain a loss function of each of the uncertain physical objects; segmenting a detected image into D rows*D columns of grid cells, and performing a calculation on the grid cells with the FCN to obtain an output (D,D,m), where m=x*y, x being a number of anchor boxes in each of grids, y=5+z+2, 5 representing whether the object is present in a grid, a horizontal coordinate of an origin of a bounding box, a longitudinal coordinate of the origin of the bounding box, a height of the bounding box, and a width of the bounding box, z representing an attribute of a detected type, and 2 representing a safety attribute and a danger level; removing an overlapping grid with an intersection over union (IoU) and non-maximum suppression (NMS) to obtain information on a bounding box and the type of the uncertain physical object entering the production line system; and warning the danger for the unsafe object according to the danger level in combination with the methods such as the voice prompting method, the system alarming method and the information pushing method.

Further, the detecting, based on binocular vision, an actual size of the uncertain physical object entering the production line system in step S5 may specifically include: performing auto-calibration on a binocular camera with a matrix laboratory (MATLAB) to obtain internal parameters, external parameters and distortion parameters of two cameras; performing homography transform on two images to project two image planes in different directions to a plane parallel to an optical axis, matching pixels of the two images with a sliding window algorithm, calculating a depth of each of the pixels to obtain a depth map, and calculating the actual size of the object with a bounding box of the uncertain object obtained in the object detection.

Further, the performing, by the DT production line system, synchronous modeling on the uncertain object in step S9 may specifically include: loading a matched 3D model to the DT production line system according to position data of the detected physical object entering the production line system: importing the matched 3D model of the uncertain object in step S8 into 3D Max software for rendering, loading a rendered 3D model to a Unity 3D-based virtual production line, and adjusting position data of the 3D model according to the position data in step S4, thereby completing model update of the virtual production line.

Compared with the prior art, the present disclosure has the following advantages:
1) With intelligent identification and warning for the uncertain physical object of the DT production line system based on the YOLO, the present disclosure implements quick object detection on the unsafe physical object in the production line system with the deep learning, reduces the probabilities of omissions and misjudgments due to subjective identification, and warns the danger automatically and timely according to the detected danger level, thereby reducing the accidents in the workshop and ensuring the safe production.
2) With the model library for the uncertain physical objects from the non-production line system, the present disclosure quickly matches the 3D solid model from the model library through the synchronous modeling of the DT production line system for the uncertain object, and loads the 3D solid model to the virtual production line model, thereby saving the time of artificial modeling, rendering and importing of the model into the DT system, and ensuring the precise mapping and virtual-real synchronization of the DT system.

DETAILED DESCRIPTION OF THE EMBODIMENTS

The technical solutions in the embodiments of the present disclosure will be clearly and completely described below with reference to the drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Figure 1:
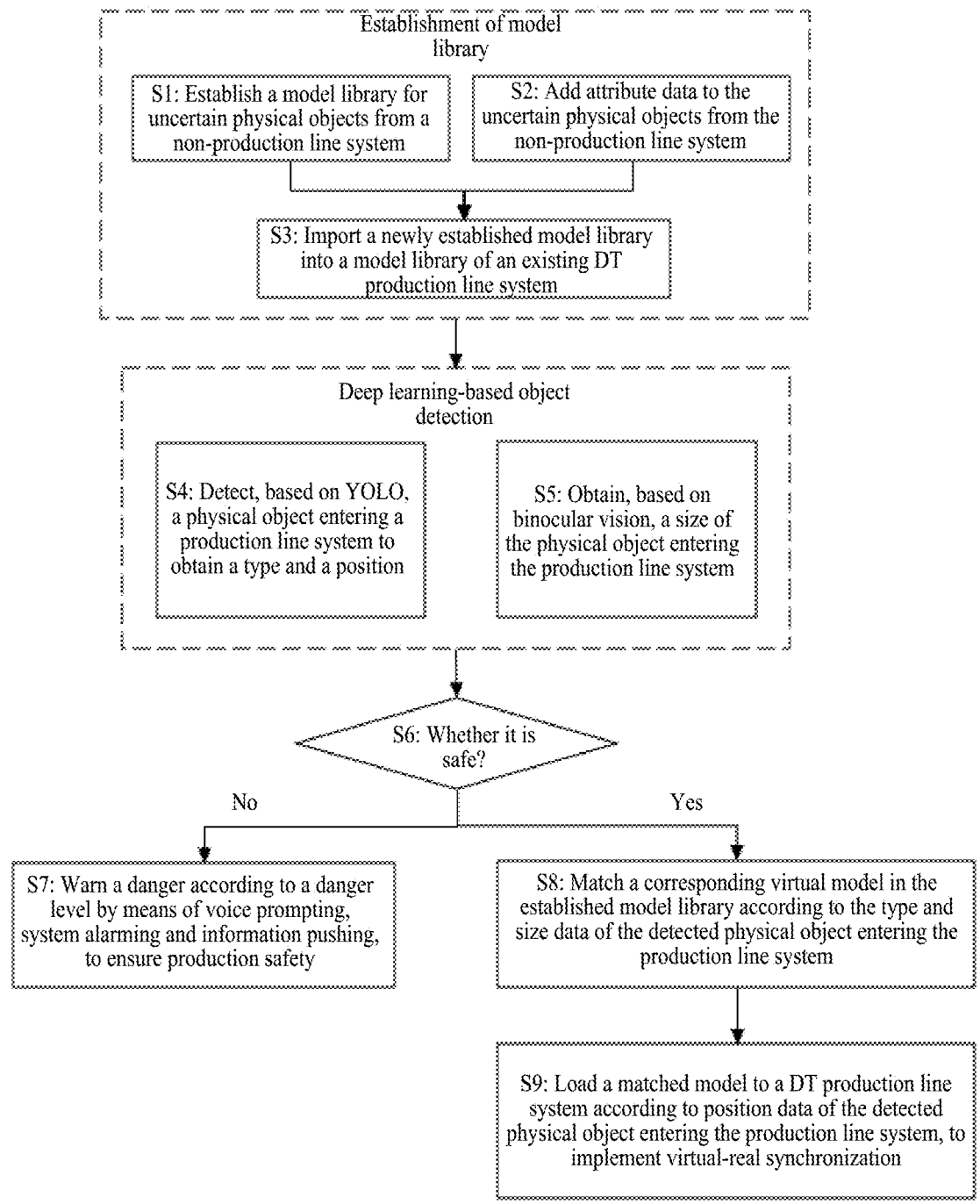
FIG. 1 is a general flowchart according to the present disclosure.

As shown in FIG. 1, an embodiment of the present disclosure provides an intelligent identification and warning method for an uncertain object of a production line in a DTE, including the following specific steps:

S1: Establish a model library for uncertain physical objects from a non-production line system: Establish, for a specific workshop production line system with Pro/E 3D modeling software, 3D solid models of all uncertain physical objects (a safe object such as a worker, a device and a material as well as an unsafe object such as an open flame, oil leakage and gas leakage not included in the production line) possibly entering the production line from the non-production line system, and classify the models to obtain model families, such as a model family for an automatic guided vehicle (AGV) type, and a model family for a forklift type.

S2: Add attribute data to the uncertain physical objects from the non-production line system: Determine, according to knowledge of a design engineer and a manufacturing engineer, the attribute data for the uncertain physical objects from the non-production line system, including a name, a serial number (unique identifier), a type, dimensions, a safety (including the safe object and the unsafe object) and a danger level (only for the unsafe object), and directly add the data to established 3D solid models of the uncertain objects through an application programming interface (API) function for external data of a secondary development interface ProToolkit of the Pro/E software, where ProExtdataInit( ) is used to initialize the data, ProExtdataSlotCreate( ) is used to create a space required by the external data, and ProExtdataSlotWrite( ) is used to write the data to the models.

S3: Import an established model library and added attribute data for the uncertain physical objects from the non-production line system in Steps S1 and S2 into a model library of an existing DT production line system: Establish a virtual production line of the DT production line system with Unity 3D; establish a scenario and a rendering model with 3D Max after establishing the 3D models of the uncertain physical objects with the Pro/E software; export elements in the model and the scenario as a .FBX format; and import components in the scenario and the model into the Unity 3D.

S4: Perform, based on YOLO, auto-detection on an uncertain physical object entering the production line system: Prepare images of the uncertain physical objects from the non-production line system, tag the images and input the images to a convolutional neural network (CNN) for training to obtain a training set, transmit on-site video data of the production line to a YOLO V3 model for prediction, and remove an overlapping grid with an IoU and NMS to obtain a bounding box, a type and other information of the uncertain physical object entering the production line system.

S5: Detect, based on binocular vision, a size of the uncertain physical object entering the production line system: Photograph the uncertain physical objects from the non-production line system with two cameras to obtain two digital images, and calibrate the two cameras to obtain internal and external parameters of the two cameras as well as a relative distance between the two cameras; correct original images according to a calibration result, such that imaging origins of left and right images have a consistent coordinate, and two corrected images are located on a same plane; and perform pixel matching on the two corrected images to obtain depth information, and obtain the size of the object in combination with the bounding box in Step S4.

S6: Determine, in real time according to a result of object detection in each of Steps S4 and S5, a safety of the physical object entering the production line system, warn a danger in Step S7 if the physical object is an unsafe object, and perform model matching in Step S8 if the physical object is a safe object.

S7: Warn the danger: Warn the danger for the unsafe object by means of voice prompting, system alarming and information pushing, and select a different warning content according to a danger level of the unsafe object, for example, if a transport vehicle not in the production line enters the production line system, prompt an on-site worker with a broadcast for a caution, and notify a workshop manager to check an identity of the transport vehicle; and if a large fire occurs, alarm a danger by the system and notify all workers with a broadcast for an orderly evacuation S8: Match, for the safe object, a corresponding virtual model in the established model library according to detected type and size data of the uncertain physical object entering the production line: Match, according to type information in Step S4, a model family of a same type in the established model library for the uncertain physical objects from the non-production line system in Step S1, and find a specific 3D model from the model family according to the size data in Step S5.

S9: Load a matched 3D model to the DT production line system according to position data of the detected physical object entering the production line system: Import the 3D model matched in Step S8 and established with the Pro/E for the uncertain object into the 3D Max software for rendering, load a rendered 3D model to a Unity 3D-based virtual production line, and adjust position data of the 3D model with the Unity 3D according to the position data in Step S4, thereby completing model update of the virtual production line.

Figure 2:
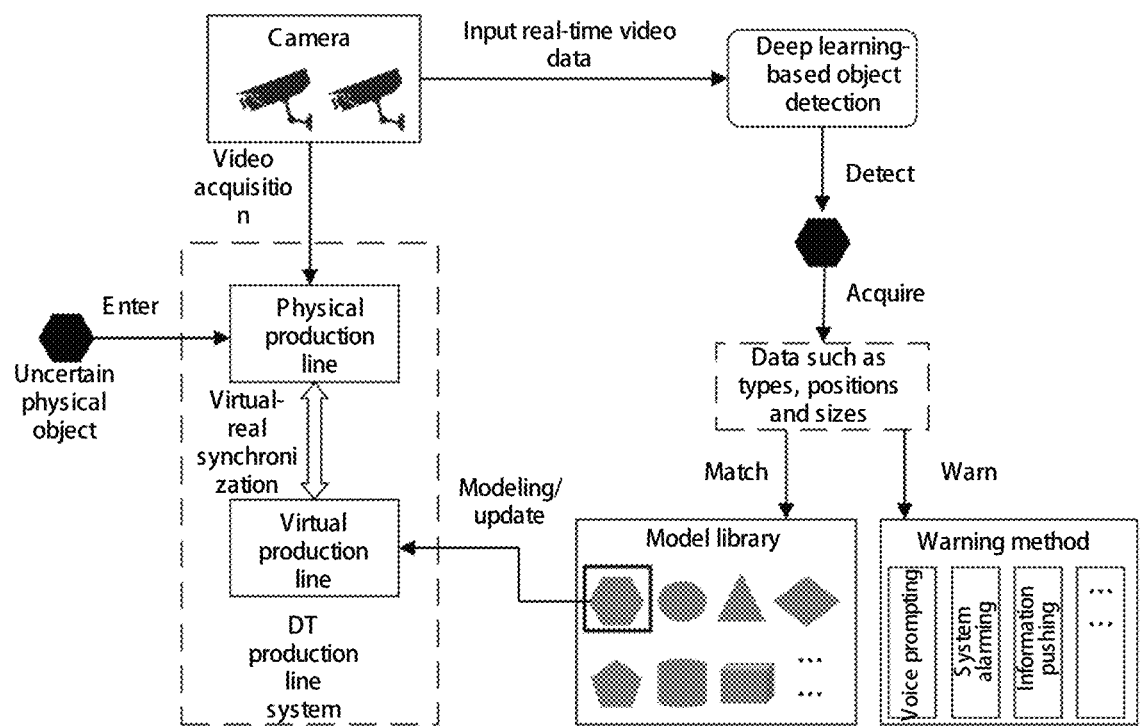
FIG. 2 is an operating principle diagram of a system according to the present disclosure.

FIG. 2 illustrates an operating principle of the intelligent identification and warning method for an uncertain object of a production line in a DTE, including a model library for uncertain physical objects from a non-production line system, intelligent identification and warning for an uncertain physical object of a DT production line system based on YOLO, auto-detection on an actual size of the uncertain physical object of the DT production line system based on binocular vision, and synchronous modeling of the DT production line system on the uncertain object.

The model library for the uncertain physical objects from the non-production line system is established as follows: Establish, for a specific workshop production line system with Pro/E 3D modeling software, 3D solid models of all uncertain physical objects possibly entering the production line from the non-production line system, and classify the models to obtain model families; add attribute data to the uncertain physical objects according to knowledge of a design engineer and a manufacturing engineer, including a name, a serial number, a type, dimensions, a safety and a danger level; and directly add the data to established 3D solid models of the uncertain physical objects through a secondary development interface ProToolkit of the Pro/E software.

The intelligent identification and warning for the uncertain physical object of the DT production line system based on the YOLO include: Perform, with a deep learning-based object detection method YOLO V3, object identification on the uncertain physical object entering the production line system to determine a type, a safety and a danger level of the uncertain physical object; and warn, for the unsafe object, the danger according to the danger level in combination with the methods such as the voice prompting method, the system alarming method and the information pushing method.

The auto-detection on the actual size of the uncertain physical object of the DT production line system based on the binocular vision includes: Photograph the uncertain physical objects from the non-production line system with a binocular camera to obtain two digital images, and calibrate two cameras to obtain internal and external parameters of the two cameras as well as a relative distance between the two cameras; correct original images according to a calibration result, such that imaging origins of left and right images have a consistent coordinate, and two corrected images are located on a same plane; and perform pixel matching on the two corrected images to obtain depth information, and obtain the actual size of the object in combination with the bounding box of the uncertain object obtained in the object detection.

Figure 3:
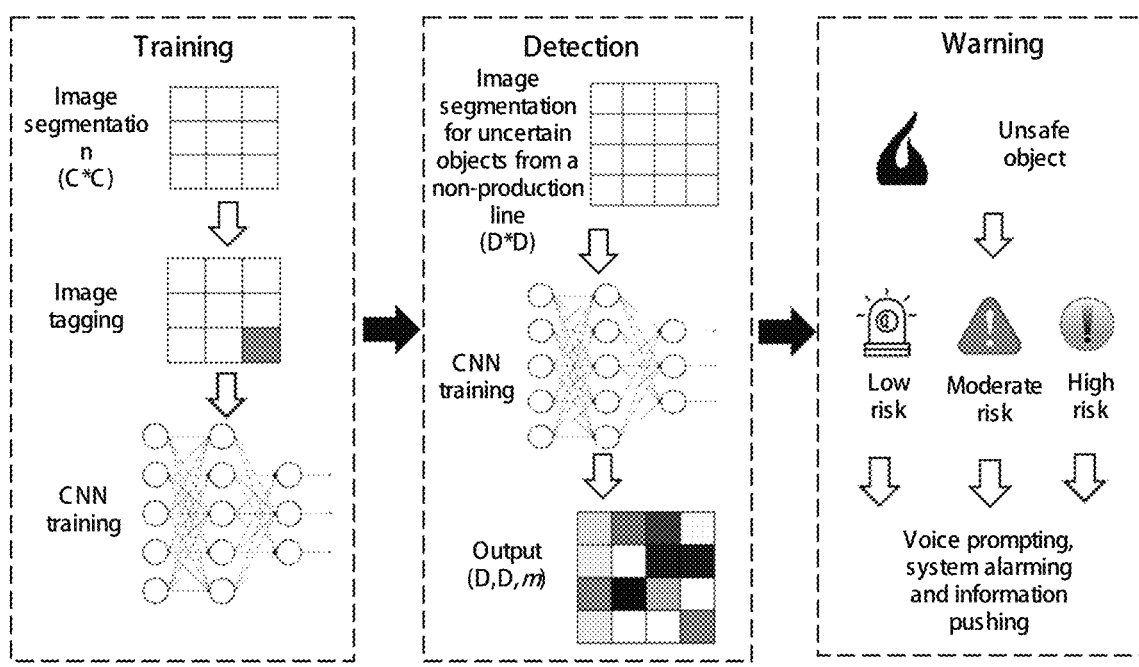
FIG. 3 is a principle diagram of intelligent identification and warning for an uncertain physical object based on deep learning according to the present disclosure.

The synchronous modeling of the DT production line system on the uncertain object includes: Match, according to type information of the uncertain physical object, a model family of a same type in the established model library for the uncertain physical objects from the non-production line system; find a specific 3D model from the model family according to the actual size data of the uncertain physical object, and import the 3D model into a virtual production line scenario established with the Unity 3D; and update a position of the 3D model of the uncertain object according to position information obtained in the object detection FIG. 3 illustrates an intelligent identification and warning principle for an uncertain physical object based on deep learning, including: Segment, with an image for the uncertain physical objects from the non-production line system as a training image, the training image into C rows*C columns of grid cells, tag segmented images, determine a bounding box, a type, a safety and a danger level of each of the segmented images, and perform a calculation on the C*C grid cells with an FCN to obtain a loss function of each of the uncertain physical objects; segment a detected image into D rows*D columns of grid cells, and perform a calculation on the grid cells with the FCN to obtain an output (D,D,m), where m=x*y, x being a number of anchor boxes in each of grids, y=5+z+2, 5 representing whether the object is present in a grid, a horizontal coordinate of an origin of a bounding box, a longitudinal coordinate of the origin of the bounding box, a height of the bounding box, and a width of the bounding box, z representing an attribute of a detected type, and 2 representing a safety attribute and a danger level; remove an overlapping grid with an IoU and NMS to obtain the bounding box, the type and other information of the uncertain physical object entering the production line system; and warn the danger for the unsafe object according to the danger level in combination with the methods such as the voice prompting method, the system alarming method and the information pushing method.

Figure 4:
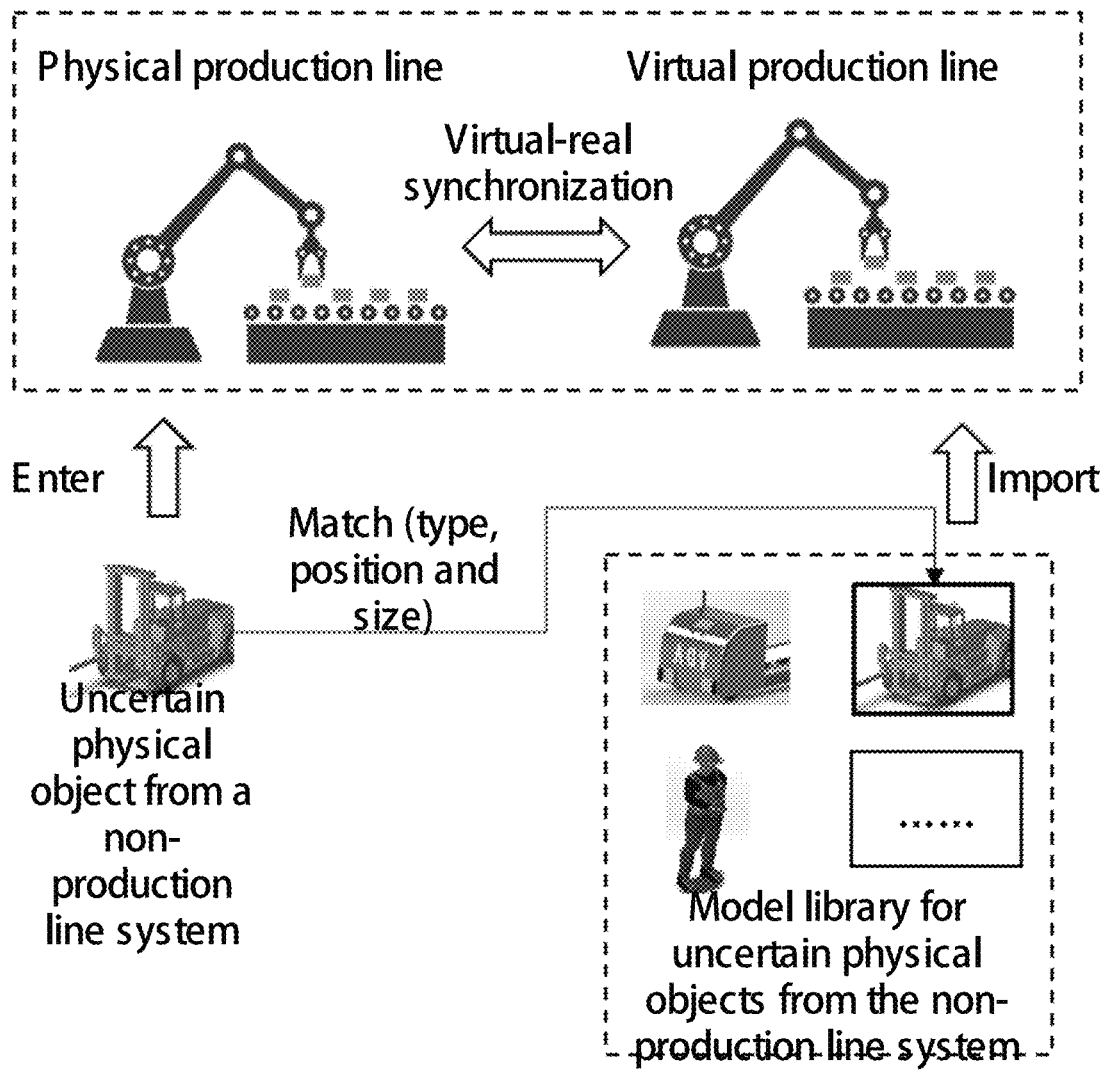
FIG. 4 is a principle diagram of synchronous modeling of a DT production line system on an uncertain object according to the present disclosure.

FIG. 4 illustrates a synchronous modeling principle of the DT production line system on the uncertain physical object, including: Match, according to type information of the uncertain physical object, a model family of a same type in the established model library for the uncertain physical objects from the non-production line system; find a specific 3D model from the model family according to the actual size data of the uncertain physical object, and import the 3D model to a virtual production line scenario established with the Unity 3D; and update a position of the 3D model of the uncertain object in the Unity 3D according to position information obtained in the object detection The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure. The components that are not explicitly defined in this example can be implemented according to the prior art.

What is claimed is:

1. An intelligent identification and warning method for an uncertain physical object entering a production line system in a digital twin environment (DTE), comprising the following steps:

S1: establishing a model library for uncertain physical objects from a non-production line system, wherein establishing the model library by establishing, for a specific workshop production line system with computer aided design (CAD) software, three-dimensional (3D) solid models of all uncertain physical objects entering the production line system from the non-production line system, and classifying the 3D solid models of the uncertain physical objects to obtain model families;

S2: adding attribute data to the uncertain physical objects from the non-production line system, wherein adding the attribute data to the uncertain physical objects by determining, according to knowledge of a design engineer and a manufacturing engineer, the attribute data for the uncertain physical objects from the non-production line system, comprising a name, a serial number, a type, dimensions, a safety and a danger level, and directly adding the attribute data to the established 3D solid models of the uncertain physical objects through a secondary development interface of the CAD software;

S3: importing a newly established model library based on the added attribute data for the uncertain physical objects from the non-production line system in steps S1 and S2 into a model library of an existing DT production line system;

S4: performing, based on you only look once (YOLO), auto-detection on the uncertain physical object entering the production line system to obtain a type and a position of the uncertain physical object;

S5: detecting, based on binocular vision, an actual size of the uncertain physical object entering the production line system;

S6: determining, in real time according to a result of the uncertain physical object detection in each of steps S4 and S5, a safety of the uncertain physical object entering the production line system, warning a danger when the uncertain physical object is an unsafe object, and performing model matching when the uncertain physical object is a safe object;

S7: warning the danger, wherein warning the danger for the unsafe object by means of voice prompting, system alarming and information pushing, and selecting a different warning content according to a danger level of the unsafe object, when a transport vehicle not from the production line system enters the production line system, prompting an on-site worker with a voice prompt for a caution, and notifying a workshop manager by pushing information to check an identity of the transport vehicle, and when a fire occurs in the production line system, alarming a danger by the production line system and prompting all workers with a voice prompt for an orderly evacuation;

S8: matching, for the safe object, a corresponding virtual model in the new established model library according to the detected type and actual size of the uncertain physical object entering the production line system, matching, according to the detected type of the uncertain physical object in step S4, a model family of a same type in the new established model library for the uncertain physical objects from the non-production line system in step S1, and finding a specific 3D solid model from the model family according to the detected actual size in step S5; and S9: loading a matched 3D solid model to the existing DT production line system according to the position data of the detected uncertain physical object entering the production line system, to implement virtual-real synchronization.

2. The intelligent identification and warning method according to claim 1, wherein the model library for the uncertain physical objects from the non-production line system aims at the uncertain physical objects with which models are automatically matched, and comprises not only the 3D solid models of the uncertain physical objects, but also the correspondingly added attribute information comprising the name, the serial number, the type, the dimensions, the safety and the danger level, wherein a model family to which each of the uncertain physical objects belongs is identified through the type, a specific matched 3D solid model is determined through the dimensions, whether to warn the danger is determined through the safety, and a danger warning content is determined through the danger level.

3. The intelligent identification and warning method according to claim 1, wherein the performing, based on the YOLO, the auto-detection on the uncertain physical object entering the production line system in step S4 comprises: performing, with a deep learning-based object detection method YOLO V3, object identification on the uncertain physical object entering the production line system to determine the type, the safety and the danger level of the uncertain physical object; adjusting, when training a deep learning model, parameters of the YOLO V3 in combination with a resolution, an illumination, a proportion of a detected object to a background, and the like in a video photographed by an on-site monitoring system of the production line system, so as to improve an accuracy of the object detection; warning, for the unsafe object upon completion of the object detection, the danger according to the danger level in combination with the methods such as the voice prompting method, the system alarming method and the information pushing method, the warning content being determined according to the danger level and the unsafe object; segmenting, with an image for the uncertain physical objects from the non-production line system as a training image, the training image into C rows*C columns of grid cells, tagging segmented images, determining a bounding box, a type, a safety and a danger level of each of the segmented images, and performing a calculation on the C*C grid cells with a fully convolutional network (FCN) to obtain a loss function of each of the uncertain physical objects; segmenting a detected image into D rows*D columns of grid cells, and performing a calculation on the grid cells with the FCN to obtain an output (D,D,m), wherein m=x*y, x being a number of anchor boxes in each of grids, y=5+z+2, 5 representing whether the object is present in a grid, a horizontal coordinate of an origin of a bounding box, a longitudinal coordinate of the origin of the bounding box, a height of the bounding box, and a width of the bounding box, z representing an attribute of a detected type, and 2 representing a safety attribute and a danger level; removing an overlapping grid with an intersection over union (IoU) and non-maximum suppression (NMS) to obtain information on a bounding box and the type of the uncertain physical object entering the production line system; and warning the danger for the unsafe object according to the danger level in combination with the methods such as the voice prompting method, the system alarming method and the information pushing method.

4. The intelligent identification and warning method according to claim 1, wherein the detecting, based on the binocular vision, the actual size of the uncertain physical object entering the production line system in step S5 comprises: performing auto-calibration on a binocular camera with a matrix laboratory (MATLAB) to obtain internal parameters, external parameters and distortion parameters of two cameras, performing homography transform on two images to project two image planes in different directions to a plane parallel to an optical axis, matching pixels of the two images with a sliding window algorithm, calculating a depth of each of the pixels to obtain a depth map, and calculating the actual size of the object with a bounding box of the uncertain object obtained in the object detection.

5. The intelligent identification and warning method according to claim 1, wherein the performing, by the existing DT production line system, synchronous modeling on the uncertain object in step S9 comprises: loading a matched 3D solid model to the existing DT production line system according to position data of the detected uncertain physical object entering the production line system, importing the matched 3D solid model of the uncertain physical object in step S8 into 3D Max software for rendering, loading the rendered 3D solid model to a Unity 3D-based virtual production line, and adjusting position data of the 3D solid model according to the position data in step S4, thereby completing model update of the Unity 3D-based virtual production line.

* * * * *